United States Patent
Srivastava et al.

(10) Patent No.: US 8,666,957 B2
(45) Date of Patent: Mar. 4, 2014

(54) METHOD OR APPARATUS FOR LOCKING SHARED DATA

(75) Inventors: Manish Srivastava, Bangalore (IN); Ajit Malaviya, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1981 days.

(21) Appl. No.: 11/493,238

(22) Filed: Jul. 26, 2006

(65) Prior Publication Data

US 2007/0050377 A1 Mar. 1, 2007

(30) Foreign Application Priority Data

Aug. 29, 2005 (IN) .......................... 1204/CHE/2005

(51) Int. Cl.
*G06F 7/00* (2006.01)
*G06F 17/00* (2006.01)

(52) U.S. Cl.
USPC .......................................................... 707/704

(58) Field of Classification Search
USPC ..................................................... 707/8, 704
See application file for complete search history.

(56) References Cited

U.S. PATENT DOCUMENTS

| | | | | |
|---|---|---|---|---|
| 5,175,852 A * | 12/1992 | Johnson et al. | ..................... | 707/8 |
| 5,202,971 A * | 4/1993 | Henson et al. | ...................... | 707/8 |
| 5,410,697 A * | 4/1995 | Baird et al. | ..................... | 711/152 |
| 5,535,375 A * | 7/1996 | Eshel et al. | ....................... | 703/27 |
| 5,544,345 A * | 8/1996 | Carpenter et al. | ............. | 711/150 |
| 5,557,674 A * | 9/1996 | Yeow | ............................. | 713/193 |
| 5,692,178 A * | 11/1997 | Shaughnessy | ..................... | 707/8 |
| 5,832,484 A * | 11/1998 | Sankaran et al. | .................. | 707/8 |
| 5,944,789 A * | 8/1999 | Tzelnic et al. | ................. | 709/214 |
| 5,946,685 A * | 8/1999 | Cramer et al. | .................. | 707/10 |
| 5,999,930 A * | 12/1999 | Wolff | ................................ | 707/8 |
| 6,009,427 A * | 12/1999 | Wolff | ............................... | 707/10 |
| 6,035,297 A * | 3/2000 | Van Huben et al. | ............. | 707/8 |
| 6,272,491 B1 * | 8/2001 | Chan et al. | ........................ | 707/8 |
| 6,810,464 B1 * | 10/2004 | Sipple et al. | .................... | 711/122 |
| 7,188,122 B2 * | 3/2007 | Smith et al. | ................. | 707/104.1 |
| 7,222,119 B1 * | 5/2007 | Ghemawat et al. | ............... | 707/9 |
| 7,487,228 B1 * | 2/2009 | Preslan et al. | ................. | 709/219 |
| 2002/0188605 A1* | 12/2002 | Adya et al. | ........................ | 707/4 |
| 2004/0220932 A1* | 11/2004 | Seeger et al. | ..................... | 707/8 |
| 2005/0240628 A1* | 10/2005 | Jiang et al. | ................. | 707/104.1 |
| 2008/0065644 A1* | 3/2008 | Pasupuleti et al. | .............. | 707/10 |

* cited by examiner

*Primary Examiner* — Jacob F Bétit
*Assistant Examiner* — Griselle Corbo

(57) ABSTRACT

Methods and apparatus are disclosed in which locks for shared data are acquired by specifying a pathname for the shared data. One embodiment, among others, includes a method for locking shared data. The method includes the steps of receiving a first request to acquire a lock for a first pathname, storing the first pathname in a lock store, searching the lock store for a corresponding pathname in response to a further request to acquire a lock for a second pathname, and if the second pathname corresponds to the first pathname in the lock store then denying the further request to acquire the lock for the second pathname.

16 Claims, 3 Drawing Sheets

METHOD OR APPARATUS FOR LOCKING SHARED DATA

BACKGROUND OF THE INVENTION

Computer systems commonly run multiple processes which share data resources between them. In order to avoid corrupting shared data, access to the data by the multiple processes needs to be controlled by an exclusion mechanism such as a data lock. A lock is assigned to or held by a process and enables exclusive access by that process to the associated data. A given lock can be held by only one process at a time.

Some locking systems use shared memory or files to store the locks. The shared memory is accessible to all of the processes that need to share the data. Each process that needs to access the shared memory must be aware of the precise location of the shared memory in order to request a lock. If the location of the shared memory is modified, each process may need to be updated or modified. In other locking systems, a file is created at a commonly agreed location which is visible to all processes and is associated with the shared data. This file can be locked by any processes to indicate that associated data is in use. In an alternative approach, the presence or absence of a file at a given location indicates whether associated data is locked or unlocked respectively. These approaches are widely applicable but have a file management overhead.

BRIEF DESCRIPTION OF THE DRAWINGS

Embodiments of the invention will now be described, by way of example only, with reference to the accompanying drawings in which.

DETAILED DESCRIPTION OF EMBODIMENTS OF THE INVENTION

Figure 1:
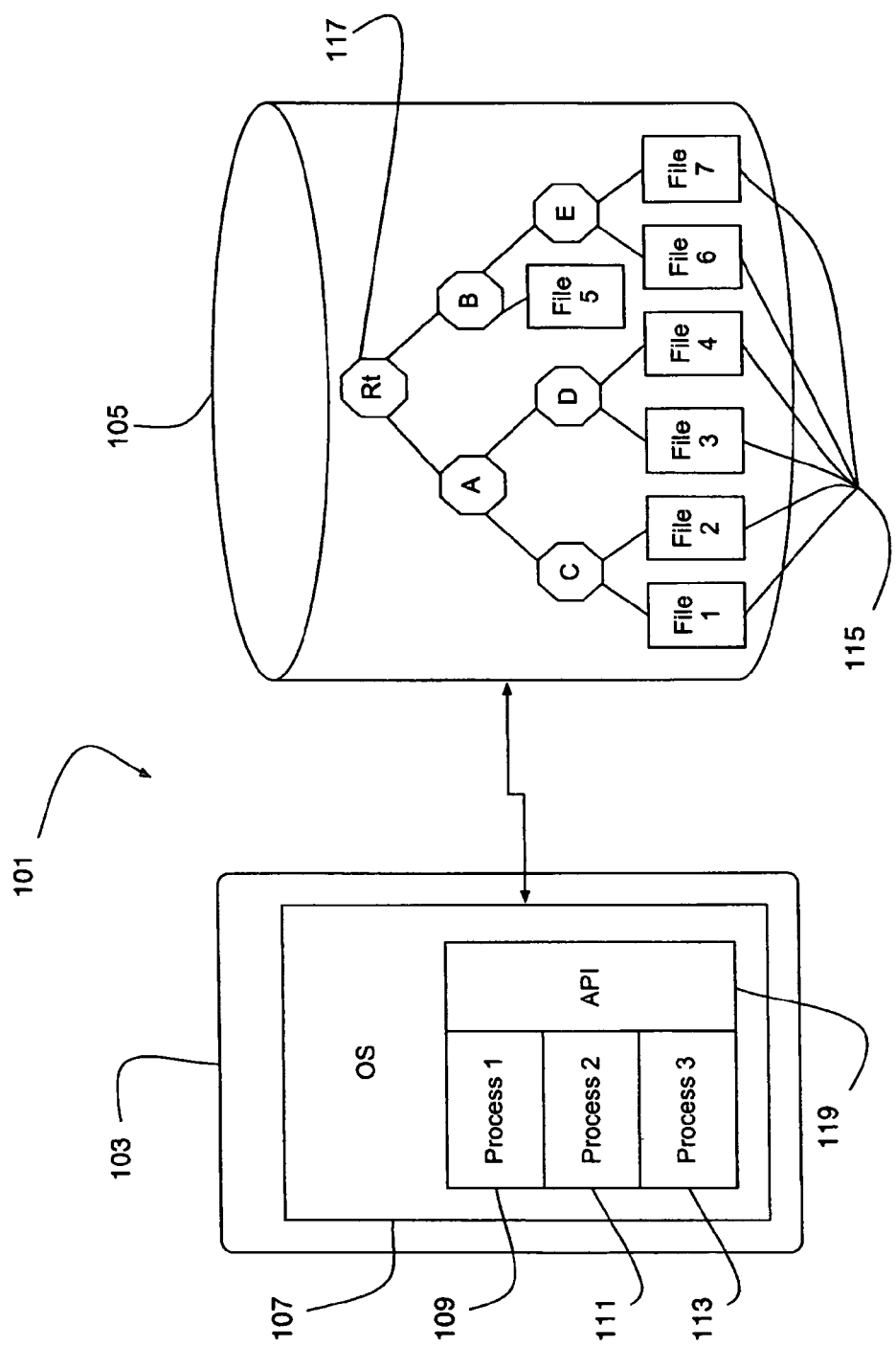
FIG. 1 is a schematic illustration of a computer system.

An embodiment of the technique disclosed, provides a method for locking shared data, the method comprising the steps of:
a) receiving a first request to acquire a lock for a first pathname;
b) storing the first pathname in a lock store;
c) in response to a further request to acquire a lock for a second pathname, searching the lock store for a corresponding pathname; and
d) if the second pathname corresponds to the first pathname in the lock store then denying the further request to acquire the lock for the second pathname.

The method may comprise the further step of removing the first pathname from the lock store in response to a request to release the lock for the first pathname. The requests may be made by one or more processes which access data represented by the pathname. Data identifying the process making the first request may be stored in association with the pathname in the lock store.

The first pathname may be a filename. The first pathname may be a directory pathname. The second pathname may be treated as corresponding to the first pathname if the second pathname represents a subset of the first pathname. A pathname representing each element indicated by the directory pathname, may be added to the lock store. If the first pathname is a directory pathname then any entry which was made by the same process that makes a request to release the lock on the directory pathname and which corresponds to the directory pathname or any pathname which is a subset of the directory, may be removed from the lock store.

If a process quits leaving any remaining locks in the lock store then the remaining locks may be released after a predetermined period. The method may be carried out by an operating system kernel. The method may be carried out by an API.

Another aspect provides apparatus for locking shared data, the apparatus being operable to:
receive a first request to acquire a lock for a first pathname;
store the first pathname in a lock store;
receive a further request to acquire a lock for a second pathname and in response to search the lock store for a corresponding pathname; and
deny the further request to acquire the lock for the second pathname if the second pathname corresponds to the first pathname in the lock store.

Also described is apparatus for locking shared data, the apparatus comprising:
means for receiving a first request to acquire a lock for a first pathname;
means for storing the first pathname in a lock store; and
means operable in response to a further request to acquire a lock for a second pathname, to search the lock store for a corresponding pathname and, if the second pathname corresponds to the first pathname in the lock store, to deny the further request to acquire the lock for the second pathname.

An embodiment provides a program or group of programs for a programmable device or group of programmable devices arranged to carry out a method for locking shared data, the method comprising the steps of:
a) receiving a first request to acquire a lock for a first pathname;
b) storing the first pathname in a lock store;
c) in response to a further request to acquire a lock for a second pathname, searching the lock store for a corresponding pathname; and
d) if the second pathname corresponds to the first pathname in the lock store then denying the further request to acquire the lock for the second pathname.

With reference to FIG. 1, a computer system 101 comprises a processor 103 connected to a storage device 105 in the form of a disk drive. The processor 105 is running an operating system (OS) 107, which in the embodiment described herein, is in the form of a version of the Linux™ operating system. The operating system is running three application program processes (Process 1, Process 2, Process 3) 109, 111, 113 which each need access to shared data held in seven files (Files 1-7) 115 stored in a hierarchical directory structure 117 on the storage device 105.

The directory structure 117 comprises a root directory (Rt) and a set of subdirectories (A to E) arranged in a hierarchy. The location of each file 115 in the directory 117 is identified by a unique pathname. A pathname, for a given file in the Linux™ OS, is a sequence of directory names, separated by a slashes, which lead from the root directory (Rt) down the hierarchy to the given file. For example, the pathname for File 1 in FIG. 1 is: /Rt/A/C/File 1. Pathnames are used by the OS 107 and application programs to locate the files and data that they require for processing.

An application program interface (API) in the form of a lock managing program 119 is also running on the OS 107, which provides a locking mechanism to the processes 109, 111, 113 for the shared data held in the files 115. In order to access shared data, a process must first acquire the lock for that data by sending a request to the lock managing program 119. If the file for which the lock is requested is available then it is locked and accesses allowed exclusively by the requesting process. If the requested file is already locked then the request is refused and the requesting process must wait until the file is unlocked. A given file is unlocked in response to a release request to the lock managing program from the process holding the current lock for that file.

Figure 2:
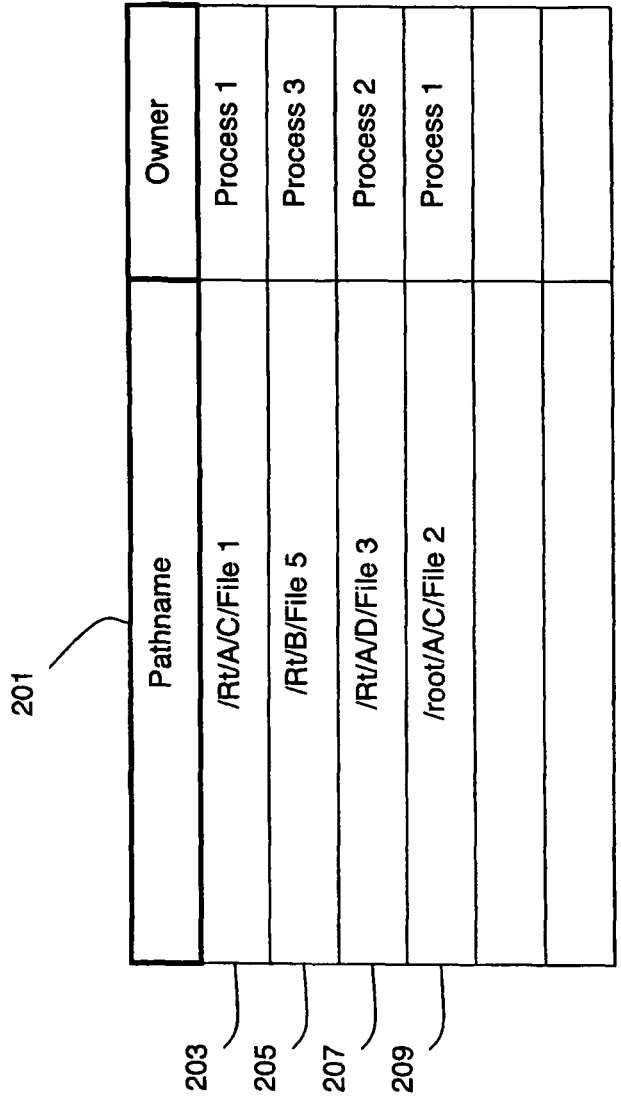
FIG. 2 is a table illustrating data produced in the computer system of FIG. 1.

With reference to FIG. 2, the lock managing program 119 stores a list of locks, in force at any given time, in a lock store 201. When a process makes a request to the lock managing program to acquire a lock, the request specifies the pathname of the file for which a lock is required. If the requested lock is allowed, this data is stored in the lock store 201 along with an identification of the process which acquired the lock. For example, the lock store 201 in FIG. 2 shows four locks 203, 205, 207, 209. The first lock 203 has been acquired by Process 1 on File 1, the second lock has been acquired by Process 3 on File 5, the third lock has been acquired by Process 2 on File 3 and the fourth lock has been acquired by Process 1 on File 2. Similarly, in order to release a lock, a requesting process must specify the pathname to which the lock applies and must be the same process that acquired the lock in the first place. For example, only Process 1 could release the first lock 203 in the lock table 201 of FIG. 2.

Figure 3:
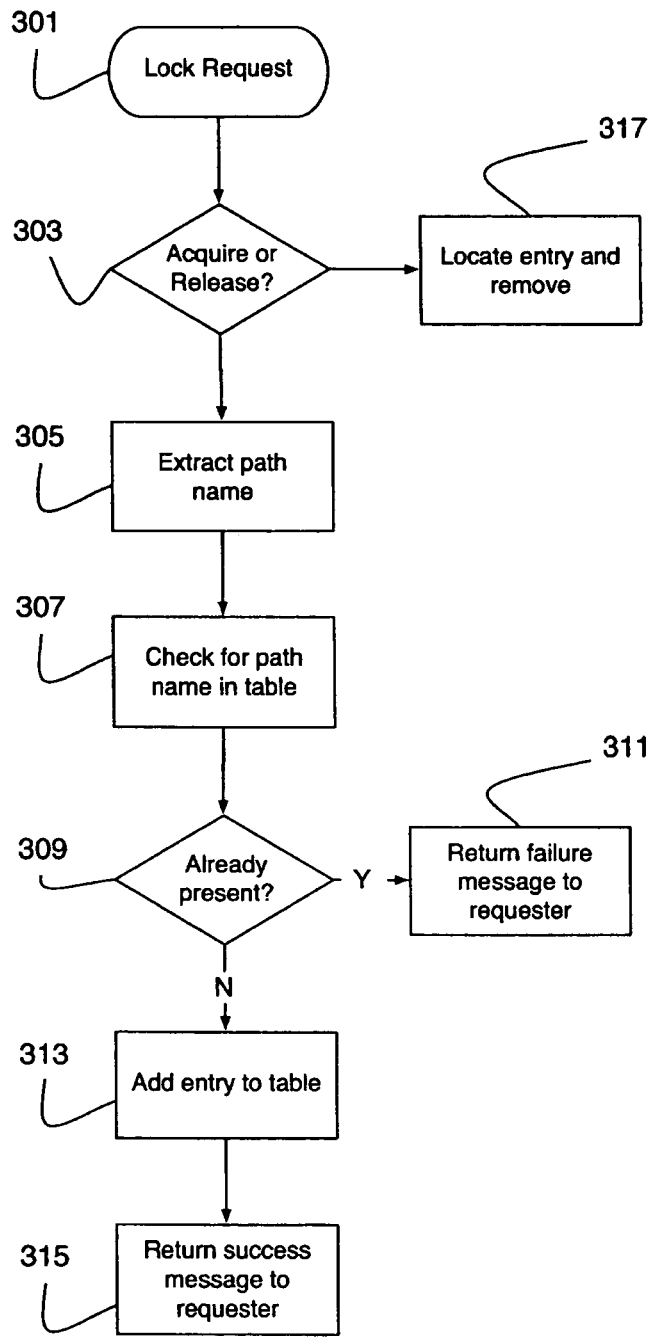
FIG. 3 is a flow chart illustrating processing carried out in the computer system of FIG. 1.

The processing carried out by the lock managing program 119 will now be described further with reference to the flow chart of FIG. 3. At step 301, processing is triggered by the receipt of a lock request from one of the processes 109, 111, 113 and processing moves to step 303. At step 303, the request is inspected to determine if it is a request acquire a lock or to release a lock. If the request is to acquire a lock then processing moves to step 305 where the pathname to be locked is extracted from the request. Processing then moves to step 307 where the lock table 201 is searched for an existing lock having a pathname corresponding to the extracted pathname. If a matching pathname is located then from step 309, processing moves to step 311 where a message is returned to the requesting process that the specified pathname is already locked.

If at step 309 no match has been found to the requested pathname in the lock table then processing moves to step 313. At step 313, the pathname is added to the lock table 201 as a new lock along with the identification of the process which has acquired the lock. Processing then moves to step 315 where a success message is returned to the requesting process indicating that the lock specified by the pathname has been successfully acquired.

If at step 303 the lock request is for the release of a lock then processing moves to step 317. At step 317, the lock table is searched for an existing lock having a pathname which corresponds to the pathname specified in the request. If a match is found then the owner of the lock specified in the lock table is compared to the identifier of the process requesting the release of the lock. If the pathname is located in the lock table and the owner and requester identifiers correspond then the lock is released by removing the matched entry from the lock table. If either the pathname cannot be located in the lock table or the owner of a corresponding lock and the requester are not the same process then the release request fails and a message indicating failure is returned to the requesting process.

The lock managing program does not take any steps to determine if the pathname specified in any request actually exists in the directory structure 117. It is the responsibility of the requesting process to determine whether or not the data exists. The lock managing program will provide a lock for any pathname specified in a request from a process. The pathnames are treated as logical pathnames in that they do not necessarily bear any relation to actual pathnames in the file system. Furthermore, the processing of the lock managing program has no effect on the file system itself or any actual pathname that may correspond to any logical pathname processed.

In another embodiment, the lock managing program is arranged to check if a file exists when a request is received to acquire a lock on the file. If no file exists then an error message is returned to the requester.

In a further embodiment, if the lock managing program can receive a lock request which specifies a directory as opposed to a file. In this case, all files in the specified directory and its sub directories are locked. Such a lock request indicates that a directory lock is required and specifies a first pathname. Any subsequent lock request that has a pathname that includes the first pathname will be refused. In other words, if the subsequent lock request specifies a pathname which corresponds to a subset of the locked directory, that is, any file or directory logically below the locked directory in the hierarchy, then the lock request is refused. For example, if the lock managing program receives the following requests from different processes:

Directory_Lock(Rt/A/D)
File_Lock(Rt/A/D/File$_{3)}$

The first lock request is a directory lock request and will result in the directory D and all its sub-directories and files being locked. Thus, the second lock request to lock File 3 will fail as it attempts to lock a subset of the pathname of the first lock, that is, a file which is logically below the locked directory. A directory lock can be released either fully by specifying the directory pathname in a release request or partially by specifying a subdirectory or file in a release request. In some embodiments, the lock managing program may add an entry to the lock table corresponding to each file or subdirectory of the specified directory.

In another embodiment, the lock managing program is arranged to detect if a process terminated without releasing its locks in the lock table. If such a situation is detected, the lock managing program is arranged to automatically release the locks after a user determined period of time.

In a further embodiment, the lock table is used to specify read or write permissions for the locked files or directories. In other words, the files or directories can be locked to prohibit just writing or reading and writing.

In another embodiment, the functions of the lock managing program are provided by the kernel of the OS.

As will be understood by those skilled in the art, different operating systems may specify pathnames differently. In DOS™ systems, the root directory is indicated by a leading backslash (\) in the pathname and each subdirectory is separated by an additional backslash. In UNIX™ operating systems the root directory is indicated by a forward slash (/) and each subdirectory is followed by a slash. In some Apple™ operating systems, directories are separated by colons.

It will be understood by those skilled in the art that the apparatus that embodies a part or all of the disclosed technique may be a general purpose device having software arranged to provide a part or all of an embodiment of the technique. The device could be single device or a group of devices and the software could be a single program or a set of programs. Furthermore, any or all of the software used to implement the disclosed technique may be communicated via various transmission or storage means so that the software can be loaded onto one or more devices.

While the present technique has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the disclosed technique, in its broader aspects is not limited to the specific details representative apparatus and method, and illustrative examples shown and described. Accordingly, departures may be made from such details without departure from the spirit or scope of applicant's general inventive concept.

The invention claimed is:

1. A method for locking shared data, the method implemented by a computer comprising the steps of:
   a) receiving a first request to acquire a lock for a first pathname;
   b) storing said first pathname in a lock store;
   c) in response to a further request to acquire a lock for a second pathname, searching said lock store for a corresponding pathname;
   d) if said second pathname corresponds to said first pathname in said lock store then denying said further request to acquire said lock for said second pathname;
   e) removing said first pathname from said lock store in response to a request to release said lock for said first pathname;
   wherein said requests are made by one or more processes which access data represented by said pathname; and
   wherein if a process quits leaving any remaining locks in the lock store then said remaining locks are released after a predetermined period.

2. A method according to claim 1 in which data identifying the process making said first request is stored in association with said pathname in said lock store.

3. A method according to claim 1, in which said first pathname is a filename and/or a directory name.

4. A method according to claim 3 in which said second pathname is treated as corresponding to said first pathname if said second pathname represents a subset of said first pathname.

5. A method according to claim 3 in which a pathname representing each element indicated by said directory pathname, is added to said lock store.

6. A method according to claim 1 in which if in step e) said request is to unlock a directory pathname then removing from said lock store any entry which was made by the same process that made said request to release said lock and which corresponds to said directory pathname or any pathname which is a subset of said directory.

7. A method according to claim 1, is carried out by an operating system kernel and/or API.

8. Apparatus for locking shared data, the apparatus being operable to:
   receive a first request to acquire a lock for a first pathname;
   store said first pathname in a lock store;
   receive a further request to acquire a lock for a second pathname and in response to search said lock store for a corresponding pathname;
   deny said further request to acquire said lock for said second pathname if said second pathname corresponds to said first pathname in said lock store;
   remove said first pathname from said lock store in response to a request to release said lock for said first pathname;
   wherein said requests are made by one or more processes which access data represented by said pathname; and
   wherein if a process quits leaving any remaining locks in the lock store then said remaining locks are released after a predetermined period.

9. Apparatus according to claim 8 being further operable to remove said first pathname from said lock store in response to a request to release said lock for said first pathname.

10. Apparatus according to claim 9 in which said requests are made by one or more processes which access data represented by said pathname.

11. Apparatus according to claim 10 in which data identifying the process making said first request is stored in association with said pathname in said lock store.

12. Apparatus according to claim 8 in which said first pathname is a directory name.

13. Apparatus according to claim 12 in which said second pathname is treated as corresponding to said first pathname if said second pathname represents a subset of said first pathname.

14. Apparatus according to claim 8 in which if said request to unlock a pathname is a request to unlock a directory, then removing from said lock store any entry which was made by the same process that made said request to release said lock and which corresponds to said directory pathname or any pathname which is a subset of said directory.

15. Apparatus for locking shared data as claimed in claim 8, the apparatus comprising:
   means for receiving a first request to acquire a lock for a first pathname;
   means for storing said first pathname in a lock store; and
   means operable in response to a further request to acquire a lock for a second pathname, to search said lock store for a corresponding pathname and, if said second pathname corresponds to said first pathname in said lock store, to deny said further request to acquire said lock for said second pathname.

16. A computer readable storage medium, having embodied thereon a program or group of programs that, when executed by a programmable device or group of programmable devices, perform a method for locking shared data, the method comprising the steps of:
   a) receiving a first request to acquire a lock for a first pathname;
   b) storing said first pathname in a lock store;
   c) in response to a further request to acquire a lock for a second pathname, searching said lock store for a corresponding pathname;
   d) if said second pathname corresponds to said first pathname in said lock store then denying said further request to acquire said lock for said second pathname;
   e) removing said first pathname from said lock store in response to a request to release said lock for said first pathname;
   wherein said requests are made by one or more processes which access data represented by said pathname; and
   wherein if a process quits leaving any remaining locks in the lock store then said remaining locks are released after a predetermined period.

* * * * *